(12) United States Patent
Yoshida

(10) Patent No.: US 8,012,007 B2
(45) Date of Patent: Sep. 6, 2011

(54) VIDEO GAME PROCESSING APPARATUS, METHOD AND COMPUTER PROGRAM PRODUCT OF PROCESSING VIDEO GAME

(75) Inventor: Naoki Yoshida, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 199 days.

(21) Appl. No.: 12/606,300

(22) Filed: Oct. 27, 2009

(65) Prior Publication Data

US 2010/0137050 A1   Jun. 3, 2010

(30) Foreign Application Priority Data

Dec. 2, 2008  (JP) ................................. 2008-307773

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................. 463/8; 463/7

(58) Field of Classification Search ...................... 463/8
See application file for complete search history.

(56) References Cited

U.S. PATENT DOCUMENTS

| | | | |
|---|---|---|---|
| 2008/0146333 | A1 | 6/2008 | Kando et al. |
| 2008/0146335 | A1 | 6/2008 | Toriyama |
| 2008/0293466 | A1 | 11/2008 | Arakawa et al. |
| 2009/0143137 | A1 | 6/2009 | Asano |
| 2009/0325707 | A1 | 12/2009 | Ichimura |

FOREIGN PATENT DOCUMENTS

| | | |
|---|---|---|
| JP | 2004-073681 | 3/2004 |
| JP | 2005-230148 | 9/2005 |
| JP | 2007-244663 | 9/2007 |
| JP | 2008-142352 | 6/2008 |
| JP | 4156648 | 7/2008 |

OTHER PUBLICATIONS

English language Abstract of JP 2008-142352 of the corresponding JP 4156648 (Jun. 26, 2008).
"Dragon Quest Monters Battle Road II ", Dengeki Nintendo DS, Japan, ASCII Media Works, Softwear Information Center, vol. 9, No. 1, Nov. 25, 2008, pp. 152-153.
"Drago Quest Kingdom Communication vol. 13, Dragon Quest Monster Battle Road", Fami-tsu DS plus Wii, Japan, Enterbrain Inc., vol. 10, No. 3 , Mar. 1, 2008, pp. 100-101.
Japan Office action in JP 2008-307773, dated Dec. 7, 2010, along with an English language translation thereof.

*Primary Examiner* — Dmitry Suhol
*Assistant Examiner* — Kevin Y Kim
(74) *Attorney, Agent, or Firm* — Greenblum & Bernstein, P.L.C.

(57) ABSTRACT

A video game, in which a player character operated by a player fights against an enemy character and one character wins by lowering a life parameter for the other character by means of an attack to a battle impossible value at which the other character cannot fight, is controlled. First and second courage points are respectively applied to the player character and the enemy character in accordance with battle content. When a predetermined operation is received from the player, it is determined whether or not each of accumulated values of the first and second courage points is a predetermined value or more. Special fighting between the player character and the enemy character is controlled in the case where it is determined that both the accumulated values are the predetermined value or more. The special fighting is different from a battle for lowering the life parameter.

7 Claims, 13 Drawing Sheets

Fig. 4

PLAYER CHARACTER
MANAGING TABLE

| CHARACTER NAME | CHARACTER ID | ACQUIRED COURAGE POINT | HP | ATTRIBUTE | NORMAL COMMAND A | NORMAL COMMAND B | .... |
|---|---|---|---|---|---|---|---|
| α | 0001 | 50/100 | 100/200 | KIDS | ATTACK A | ATTACK B | .... |

Fig. 6

COMMAND MANAGING TABLE

| PLAYER CHARACTER | ENEMY CHARACTER |
|---|---|
| HOT COMPETITION | NORMAL COMMAND |

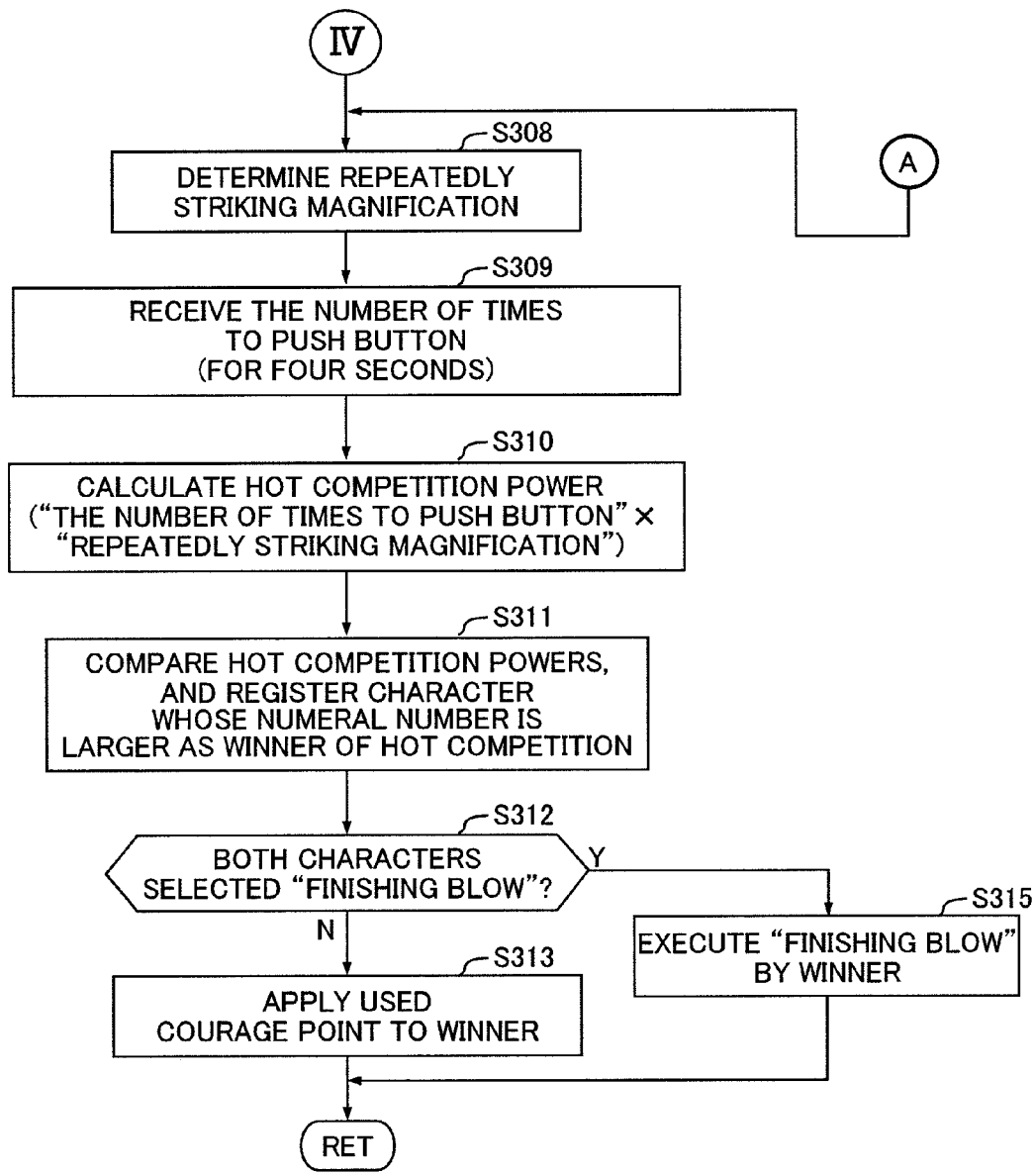

Fig. 11

REPEATEDLY STRIKING MAGNIFICATION
MANAGING TABLE

| ACTIVATABLE LEVEL | COLOR | NECESSARY COURAGE POINT | AMPLITUDE OF METER (%) | REPEATEDLY STRIKING MAGNIFICATION CORRECTED VALUE | .... |
|---|---|---|---|---|---|
| 1 | GREEN | 0 TO 20 | 40 TO 60 | | .... |
| 2 | YELLOW | 21 TO 40 | 50 TO 80 | 1 | .... |
| 3 | RED | 40 OR MORE | 70 TO 100 | | .... |

VIDEO GAME PROCESSING APPARATUS, METHOD AND COMPUTER PROGRAM PRODUCT OF PROCESSING VIDEO GAME

CROSS-REFERENCE TO RELATED APPLICATION

The present application relates to subject matter contained in Japanese Patent Application No. 2008-307773, filed on Dec. 2, 2008, the disclosure of which is expressly incorporated herein by reference in its entirety.

BACKGROUND OF THE INVENTION

1. Field of the Invention

The present invention relates to technique to control progress of a video game by displaying a player character operated by a player on a game screen, and particularly, the present invention relates to technique to control progress of a video game suitable for an arcade game.

2. Description of the Related Art

Heretofore, various arcade game apparatuses installed in a public space such as a game center have been proposed, and are used in the public space.

Japanese Patent No. 4156648 discloses that control to carry out a special attack using a courage point accumulated in accordance with elapsed time until an attack style is selected is executed in such an arcade game apparatus (see Paragraphs 0125 and 0126).

However, in the arcade game apparatus described above, only a player character is controlled to accumulate and use the courage point. Thus, variation in game content has limitations. It is desired a game apparatus that can carry out battle control rich in variation, which makes the best of a skill of a player.

SUMMARY OF THE INVENTION

The present invention has been made in order to solve the problem described above, and it is an object of the present invention to provide a video game processing apparatus, a method and a computer program product of processing a video game, which can carry out battle control in which strategic characteristics rich in variation are improved, which makes the best of a skill of a player.

In order to achieve the above object, one aspect of the present invention is directed to a video game processing apparatus for controlling progress of a video game. In the video game, a player character operated by a player fights against an enemy character and one character wins by lowering a life parameter set up for the other character by means of an attack to a battle impossible value at which the other character cannot fight. The video game processing apparatus includes a first courage point applier that applies a first courage point to the player character in accordance with battle content of the player character.

The video game processing apparatus also includes a second courage point applier that applies a second courage point to the enemy character in accordance with battle content of the enemy character.

The video game processing apparatus also includes a predetermined operation receiver that receives a predetermined operation from the player.

The video game processing apparatus also includes a courage point determiner that, when the predetermined operation receiver receives the predetermined operation, determines whether or not each of an accumulated value of the first courage point and an accumulated value of the second courage point is a predetermined value or more.

The video game processing apparatus also includes a special fighting controller that controls special fighting between the player character and the enemy character in the case where the courage point determiner determines that both the accumulated values of the first courage point and the second courage point are the predetermined value or more, the special fighting being different from a battle for lowering the life parameter.

By constructing the video game processing apparatus as described above, it is possible to carry out battle control in which strategic characteristics rich in variation are improved, which makes the best of a skill of a player.

In the video game processing apparatus according to the present invention, it is preferable that each of the first and second courage points is a point that is to be applied to the corresponding character in accordance with a period of time that elapses from the time when reception of selection of any action content specifying command for specifying action content of the corresponding character in a battle is started to the time when selection of an action content specifying command is actually received.

In the video game processing apparatus according to the present invention, it is preferable that the special fighting controller includes: a predetermined command receiver that receives an input of a predetermined command until a predetermined period of time elapses after the special fighting is started; a reception number counter that counts up the reception number of times when the input of the predetermined command is received during the predetermined period of time; a special fighting point calculator that calculates a special fighting point on the basis of the reception number of times counted up by the reception number counter; and a winner determiner for determining that one character whose special fighting point calculated by the special fighting point calculator is more than that of the other character wins the special fighting.

In the video game processing apparatus according to the present invention, it is preferable that the special fighting controller further includes: a usage point receiver that receives a magnification level determining point, the magnification level determining point being used to determine a magnification level of the courage point; and a magnification level determiner that determines the magnification level on the basis of the magnification level determining point received by the usage point receiver, wherein the special fighting point calculator calculates the special fighting point by multiplying the reception number of times counted up by the reception number counter by the magnification level determined by the magnification level determiner.

In the video game processing apparatus according to the present invention, it is preferable that the special fighting controller further includes a courage point applier that applies the courage point used as the magnification level determining point to the character that won the special fighting.

In the video game processing apparatus according to the present invention, it is preferable that the video game processing apparatus has housing, and the video game processing apparatus further comprises: a member projection controller that causes a predetermined member to project from the housing, the member projection controller being placed in the housing, the predetermined member being able to be inserted into the housing by means of an operation of the player, wherein the usage point receiver receives the magnification level determining point in accordance with a period of time while the predetermined member caused to project from the housing by the member projection controller becomes a predetermined rotational state by means of a rotational operation of a rotary section and the predetermined member is provided with the rotary section, and wherein the magnification level determiner determines, when the predetermined member caused to project from the housing by the member projection controller is inserted into the housing, the magnification level determining point received by the usage point receiver as the magnification level determining point used to determine the magnification level.

In the video game processing apparatus according to the present invention, it is preferable that the video game processing apparatus has housing, and the video game processing apparatus further comprises: a member projection controller that causes a predetermined member to project from the housing, the member projection controller being placed in the housing, the predetermined member being able to be inserted into the housing by means of an operation of the player, wherein the predetermined operation receiver receives a rotational operation of a rotary section as the predetermined operation and the predetermined member caused to project from the housing by the member projection controller is provided with the rotary section.

Further, another aspect of the present invention is directed to a method of controlling progress of a video game. In the video game, a player character operated by a player fights against an enemy character, and one character wins by lowering a life parameter set up for the other character by means of an attack to a battle impossible value at which the other character cannot fight. The method includes applying a first courage point to the player character in accordance with battle content of the player character.

The method also includes applying a second courage point to the enemy character in accordance with battle content of the enemy character.

The method also includes receiving a predetermined operation from the player.

The method also includes determining, when the predetermined operation is received, whether or not each of an accumulated value of the first courage point and an accumulated value of the second courage point is a predetermined value or more.

The method also includes controlling special fighting between the player character and the enemy character in the case where it is determined that both the accumulated values of the first courage point and the second courage point are the predetermined value or more, the special fighting being different from a battle for lowering the life parameter.

Moreover, still another aspect of the present invention is directed to a computer program product for controlling progress of a video game. In the video game, a player character operated by a player fights against an enemy character, and one character wins by lowering a life parameter set up for the other character by means of an attack to a battle impossible value at which the other character cannot fight. The computer program product according to the present invention causes a computer to execute steps including applying a first courage point to the player character in accordance with battle content of the player character.

The steps also include applying a second courage point to the enemy character in accordance with battle content of the enemy character.

The steps also include receiving a predetermined operation from the player.

The steps also include determining, when the predetermined operation is received, whether or not each of an accumulated value of the first courage point and an accumulated value of the second courage point is a predetermined value or more.

The steps also include controlling special fighting between the player character and the enemy character in the case where it is determined that both the accumulated values of the first courage point and the second courage point are the predetermined value or more, the special fighting being different from a battle for lowering the life parameter.

According to the present invention, it is possible to carry out battle control in which strategic characteristics rich in variation are improved, which makes the best of a skill of a player.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of a player character managing table;

FIG. 6 is an explanatory drawing showing an example of a storage state of a command managing table;

FIGS. 10A and 10B are a flowchart showing an example of a hot competition process; and FIG. 11 is an explanatory drawing showing an example of a storage state of a repeatedly striking magnification managing table.

DETAILED DESCRIPTION OF THE INVENTION

Hereinafter, one embodiment of the present invention will be described with reference to the drawings.

Figure 1:
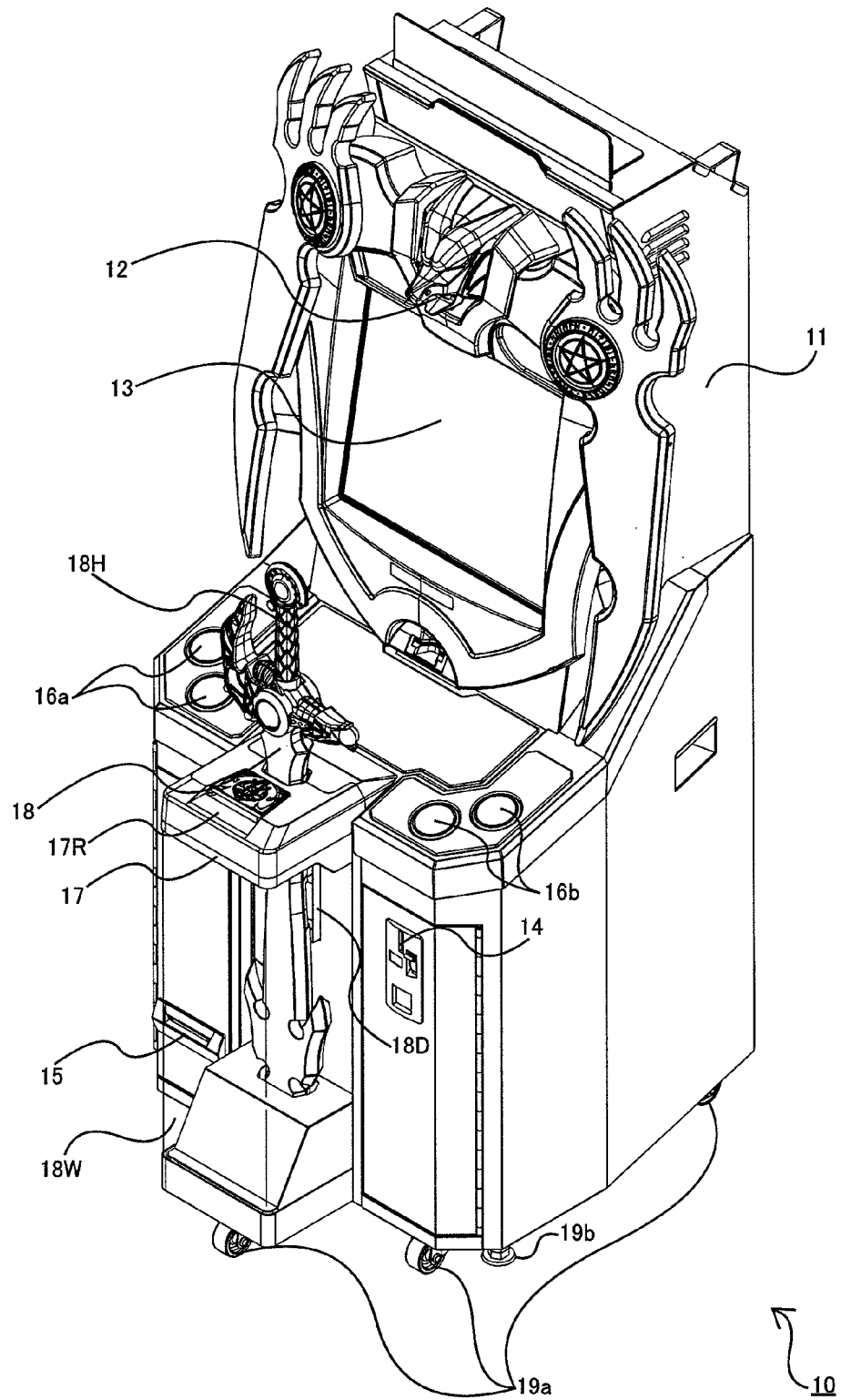
FIG. 1 is a perspective view showing a configuration of appearance of a coin-operated arcade game apparatus (arcade game apparatus) according to one embodiment of the present invention.

FIG. 1 is a perspective view showing a configuration of appearance of a coin-operated arcade game apparatus (arcade game apparatus) according to one embodiment of the present invention. As shown in FIG. 1, a speaker 12 for outputting sounds to an upper portion in the front of a housing 11, and a display device 13 for displaying an image, such as a CRT (Cathode-ray tube) and a liquid crystal display device, are arranged in a coin-operated arcade game apparatus 10. A coin insertion slot 14 for inserting coins to start a game and a card ejection slot 15 for ejecting a card for the game, will be described later, (hereinafter, referred to simply as a "card") to the outside are provided at a lower portion in the front of the housing 11.

A table-like surface is positioned between the display device 13 at the upper portion of the housing 11 and the coin insertion slot 14 at the lower portion. A first player operation button 16*a* and a second player operation button 16*b* are provided right and left on the table-like surface, respectively. The first player operation button 16*a* is a button that is operated to cause the game to proceed by a player, who carries out the game alone using the coin-operated arcade game apparatus 10 (including the case where the coin-operated arcade game apparatus 10 executes a battle process against another coin-operated arcade game apparatus having the same configuration in communication therewith (via a network or the like)), or by one player in the case where the one player carries out the game with another player using the coin-operated arcade game apparatus 10. The second player operation button 16*b* is a button that is operated to cause the game to proceed by one player using the coin-operated arcade game apparatus 10 of the present embodiment in the case where two players carry out the game.

A card insertion slot 17R for inserting a card (will be described later) and a scanner 17 for reading code data written in the inserted card are provided at a front side in the center of the table-like surface. In this regard, the code data written in the card will be described later in detail.

A sword-shaped controller 18 having a sword-like shape is provided at a rear side in the center of the table-like surface. The sword-shaped controller 18 can be moved in an up-and-down direction. The sword-shaped controller 18 is driven during progress of the game by a sword-shaped controller driving section 18D. The sword-shaped controller 18 is adapted to be raised upward from an arrangement position at start of the game (state shown in FIG. 1) when predetermined conditions (will be described later) are met. The sword-shaped controller 18 is also adapted to be restored to an original state by being slid down (or pushed downward) (that is, inserted in the housing 11) by a player when the sword-shaped controller 18 becomes a raised state. Further, a hilt portion 18H is provided in the sword-shaped controller 18. The hilt portion 18H can be rotated within a predetermined angle range (for example, 30 degrees, 45 degrees or the like) around a center line of the sword-shaped controller 18 in the up-and-down direction by means of an operation of the player. Moreover, a front and both side surfaces of the sword-shaped controller 18 are covered with a plate 18W formed of a transparent member.

Further, casters 19*a* are provided on a bottom surface of the housing 11. This makes it possible to move the coin-operated arcade game apparatus 10 easily. An adjuster 19*b* for adjusting a height of the coin-operated arcade game apparatus 10 is provided at a front side of the bottom surface of the housing 11. This makes it possible to install the coin-operated arcade game apparatus 10 stably without concavity and convexity of an installed position. Moreover, a shield case 20 (not shown in FIG. 1) is provided inside the housing 11. A mother board (platform) on which a control circuit and the like are mounted is stored in the shield case 20.

Figure 2:
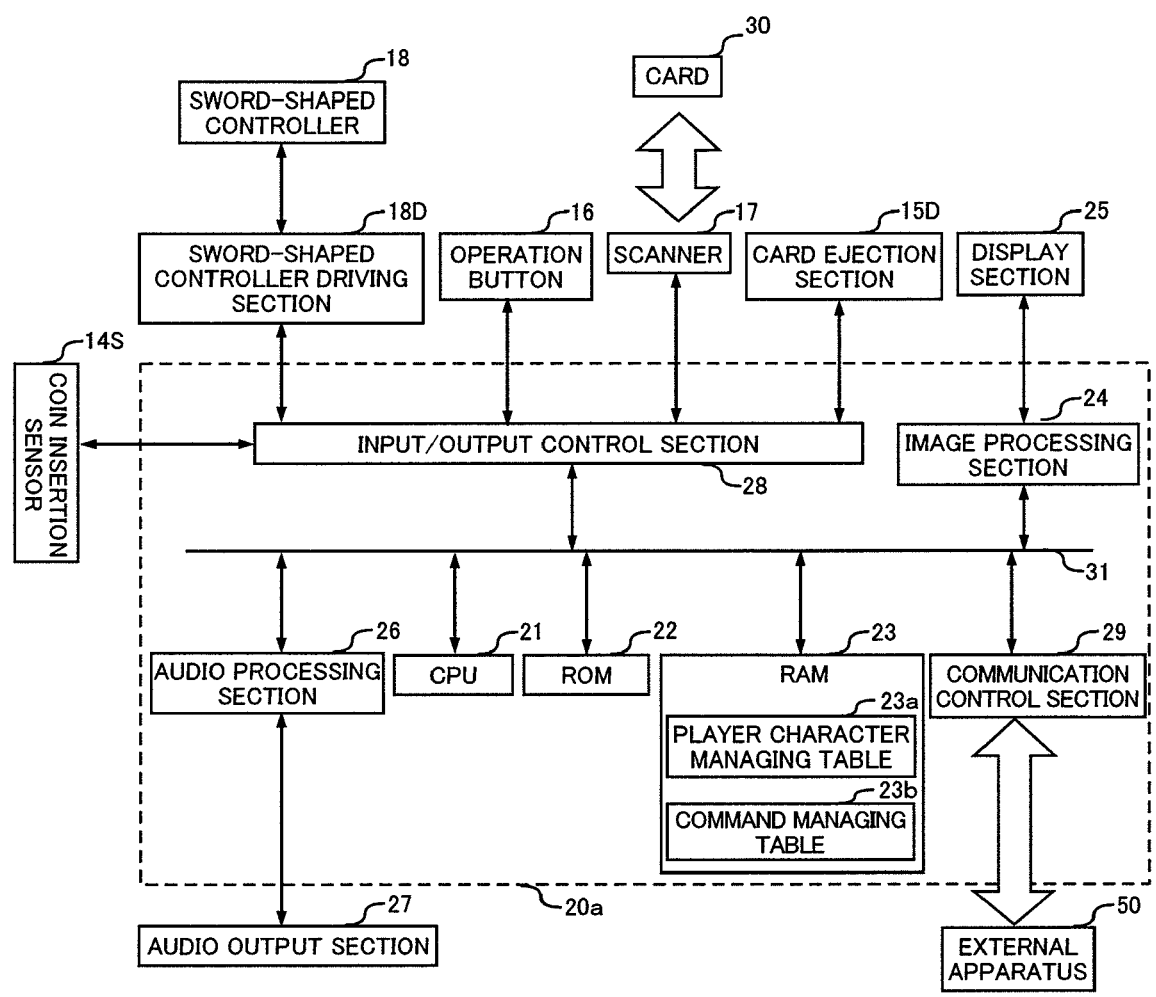
FIG. 2 is a block diagram showing a circuit configuration of a coin-operated arcade game apparatus 10.

FIG. 2 is a block diagram showing a circuit configuration of the coin-operated arcade game apparatus 10 shown in FIG. 1. As shown in FIG. 2, a control circuit (computer apparatus) 20*a* is installed in the shield case 20 of the coin-operated arcade game apparatus 10. The control circuit 20*a* includes: a CPU 21; a ROM 22; a RAM 23; an image processing section 24; an audio processing section 26; an audio output section 27; an input/output control section 28; and a communication control section 29.

The CPU 21 has a function to execute a game processing program stored in the ROM 22 and various kinds of control for progress of the game provided in the coin-operated arcade game apparatus 10 by means of operations of the player. In this regard, the CPU 21 includes an internal timer.

The game processing program executed by the CPU 21 and various data that are not changed in accordance with progress of the game are stored in the ROM 22. The RAM 23 is used as a work area of the CPU 21. Data that may be changed in accordance with progress of the game are temporarily stored in the RAM 23.

The image processing section 24 is connected to a display section 25. The image processing section 24 causes the display section 25 to display progress of the game and game screens in accordance with control of the CPU 21 and operations of the player. The display section 25 is constructed by a liquid crystal display device, for example.

The audio processing section 26 is connected to an audio output section 27. The audio processing section 26 causes the audio output section 27 to output audios in accordance with control of the CPU 21, progress of the game and operations of the player.

The input/output control section 28 is connected to: a coin insertion sensor 14S; the operation buttons 16 (16*a*, 16*b*); the scanner 17; a card ejection section 15D; and the sword-shaped controller driving section 18D. The coin insertion sensor 14S detects insertion of coins from the coin insertion slot 14. The card ejection section 15D is used to eject cards stocked a card stacker (not shown in the drawings) from the card ejection slot 15 to the outside one by one. The sword-shaped controller driving section 18D includes a sword-shaped controller state sensor (not shown in the drawings). The sword-shaped controller state sensor detects a state of the sword-shaped controller 18 (that is, raised state or inserted state) and a state of the hilt portion 18H (that is, rotational state).

A signal detected by the coin insertion sensor 14S, a signal inputted by the operation buttons 16, data read from a card by the scanner 17, and a detected signal that the sword-shaped controller 18 is inserted by the player are inputted into the CPU 21 via the input/output control section 28. Further, an instruction to raise the sword-shaped controller 18 is transmitted to the sword-shaped controller driving section 18D from the CPU 21 via the input/output control section 28.

The communication control section 29 is connected to other apparatus (external apparatus) 50 to control transmission and reception of information between the coin-operated arcade game apparatus 10 and the other apparatuses 50 thus connected. The other apparatuses 50 connected to the communication control section 29 may be other coin-operated arcade game apparatuses 10 each having the same configuration as that of the coin-operated arcade game apparatus 10. The other coin-operated arcade game apparatuses 10 thus connected may be placed in the adjacent to the coin-operated arcade game apparatus 10 to be connected to each other with a dedicated line. Alternatively, the other coin-operated arcade game apparatuses 10 may be placed at a remote location to be connected to each other via communication lines such as a telephone line and the Internet. Further, the other apparatuses 50 connected to the communication control section 29 may be a managing computer of a game center at which the coin-operated arcade game apparatus 10 is installed or the like. In this regard, the CPU 21, the ROM 22, the RAM 23, the image processing section 24, the audio processing section 26, the input/output control section 28 and the communication control section 29 are connected to each other via an internal bus 31.

In the coin-operated arcade game apparatus 10 according to the present embodiment, in order to select a player character that is to participate in the game and fight against an enemy character, cards in each of which information on a selectable character is written as the player character are used.

Some of plural types of cards are provided as basic cards for another object of execution of the game. Further, when a coin is inserted to newly carry out the game, one piece of new card is provided. In this regard, the coin-operated arcade game apparatus 10 may be configured so as to set up player characters selectable by the player in the case where the player do not have cards.

Next, the cards used for the coin-operated arcade game apparatus 10 according to the present embodiment will be described. Display indicating character information on a name of a character and its status and code data is drawn on a surface of the card 30. In this regard, in the case of the present embodiment, any one of plural kinds of characters that can be caused to participate in the game as a player character is drawn on each card 30. When the scanner 17 reads the code data, the character drawn on the card 30 appears on the game as the player character.

In this regard, the code data are those obtained by coding data for uniquely identifying a card 30. As described above, in addition to that indicating the character information, code data indicating an item for increasing offensive power of the player character and an item for displaying command content, for example, are written on the cards 30 used in the present embodiment, respectively.

Next, a "courage point", which is a feature of the game executed by the coin-operated arcade game apparatus 10 according to the present embodiment, will be described. The "courage point" in the present embodiment is a point applied to the corresponding character in accordance with a period of time elapsing from the time when reception of command selection for the character is started during a battle to the time when the command is actually selected. Namely, the shorter a period of time required to select a command is, the more a "courage point" can be accumulated. When the "courage point" reaches a predetermined value (for example, maximal value), "finishing blow" (will be described later) can be activated (that is, becomes activatable). In this regard, since the game according to the present embodiment adopts a turn-based battle system, the courage point is accumulated every turn. However, for example, the game may be configured so that a value according to a period of time required to clear a preset condition is applied as the courage point. Further, in order to cause the player to recognize a size of the courage point to be applied, for example, the game may be configured so that a gauge (courage gauge) that is started to display at reception of command selection and whose length is shortening with elapse of time until any command is selected is set up. Further, in order to cause the player to recognize the courage point acquired by the player (acquired courage point), in the present embodiment, the game is configured so that the acquired courage point is distinguishably displayed in an orb gauge (will be described later, see FIG. 7).

Next, an operation of the coin-operated arcade game apparatus 10 according to the present embodiment will be described.

Figure 3:
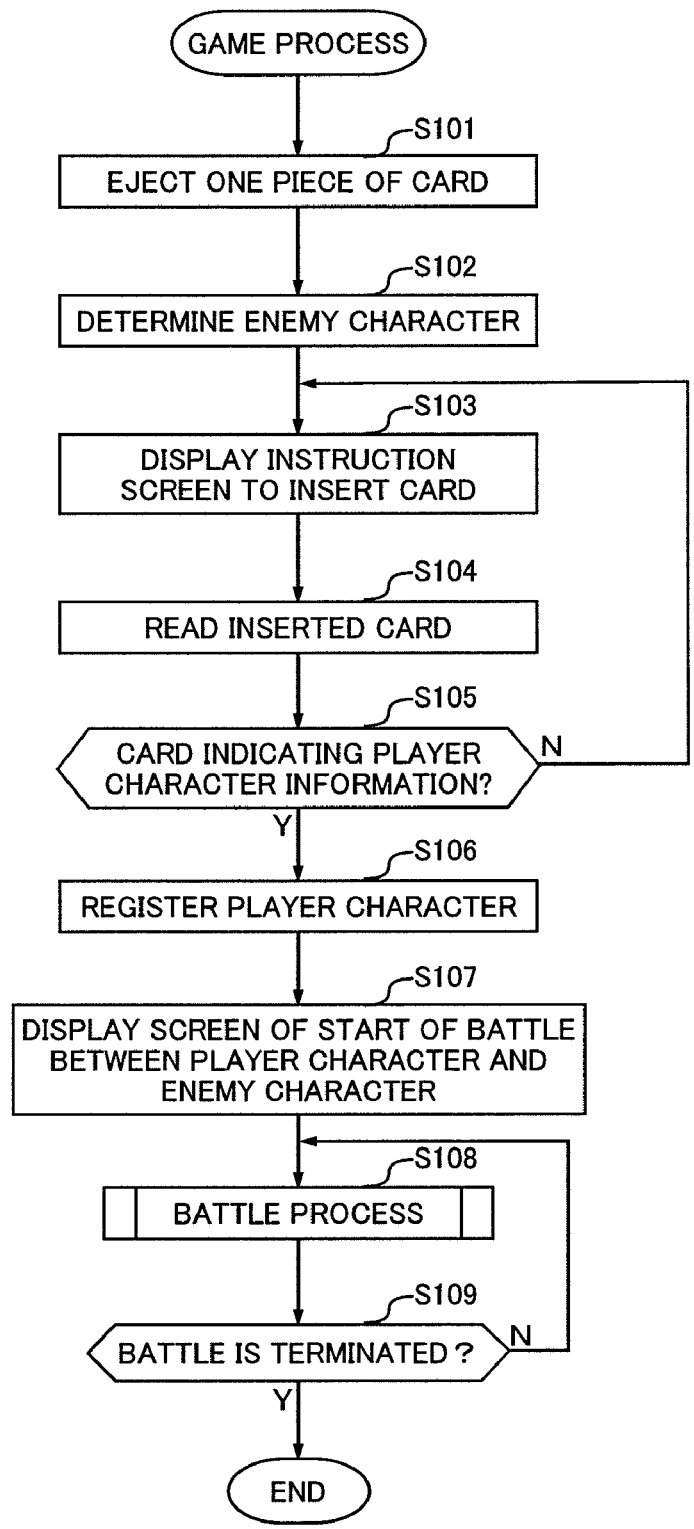
FIG. 3 is a flowchart showing an example of a game process.

FIG. 3 is a flowchart showing an example of a game process executed by the coin-operated arcade game apparatus 10. The game process is started when the coin insertion sensor 14S detects a coin inserted from the coin insertion slot 14. In this regard, a player 1 operating the coin-operated arcade game apparatus 10 has already possessed some pieces of cards here. The coin-operated arcade game apparatus 10 is communicated with another coin-operated arcade game apparatus 10' operated by a player 2. An operation of the coin-operated arcade game apparatus 10, which receives operations of the player 1 when to carry out fighting play in this case, will be described as an example.

In the game process, an enemy character that is to be an opponent on the game and a player character that is a subject operated by the player 1 are determined, and a process from start of a battle to termination thereof is executed. In this regard, the content of processes without reference to the present invention may be omitted.

The CPU 21 first controls the card ejection section 15D to eject a piece of card 30 from cards 30 stacked on the card stacker (Step S101).

Next, the CPU 21 determines a type of enemy character to carry out a battle against the player character in this game (Step S102). In this regard, the CPU 21 determines that a character operated by the player 2 is an enemy character NPC here. The CPU 21 then sends an instruction to the image processing section 24, and causes the display section 25 to display a screen for instructing the player to insert a card 30 in hand into the card insertion slot 17R (Step S103). When the player inserts the card 30 into the card insertion slot 17R, the CPU 21 causes the scanner 17 to read code data written on the card 30 (Step S104). The CPU 21 determines whether the code data read by the scanner 17 indicate character information or not (Step S105). In the case where it is determined that the code data do not indicate character information, the CPU 21 ignores the read code data, and the processing flow shifts to the process at Step S103.

In the case where it is determined that the code data read by the scanner 17 indicate character information, the CPU 21 reads out initial information regarding the character corresponding to the read code data from the ROM 22, and registers the character in the player character managing table 23a stored in the RAM 23 as a player character PC for carrying out a battle (Step S106).

FIG. 4 is an explanatory drawing showing an example of a storage state of player character information in the player character managing table 23a. As shown in FIG. 4, the player character information includes information regarding a character name, a character ID, an acquired courage point, an HP, attribute of the character, the type of an executable normal command, and an additional card. The "acquired courage point" means a current value of the courage point acquired by the player character PC. Further, in the present embodiment, "kids" or "monsters" are set to the attribute of the character. The player character managing table 23a is configured so that "hot competition", which is one kind of command to supply an instruction to the player character PC, can be selected by meeting predetermined conditions (will be described later) only in the case of the kids. Further, the normal commands are commands corresponding to right and left buttons of the first player operation button 16a.

Next, the display section 25 is caused to display a battle start screen between the player character PC and the enemy character NPC (Step S107), the CPU 21 starts a battle process (will be described later) (Step S108), and as a result, the CPU 21 determines whether a predetermined battle termination condition is met or not (Step S109). In the case where it is determined that the battle is terminated ("Yes" at Step S109), the CPU 21 terminates the game process. On the other hand, in the case where it is determined that the battle is not terminated ("NO" at Step S109), the CPU 21 causes the processing flow to shift to Step S108. In this regard, as the predetermined battle termination condition of the battle, a condition that an HP (Hit Point: physical energy value of the character) of either the player character PC or the enemy character NPC becomes zero may be set up, for example.

Figure 5A:
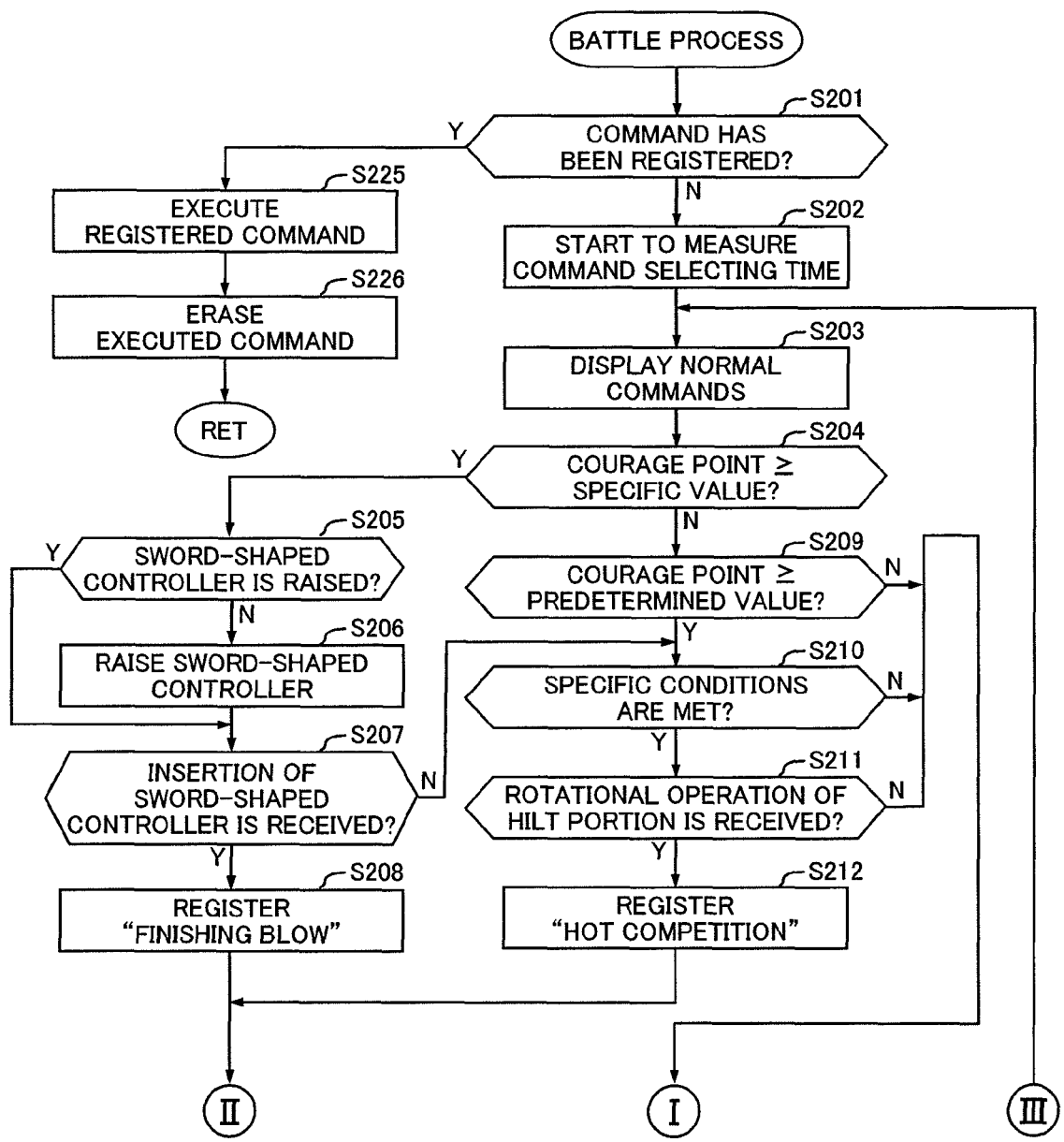
FIGS. 5A and 5B are a flowchart showing an example of a battle process.
Figure 5B:
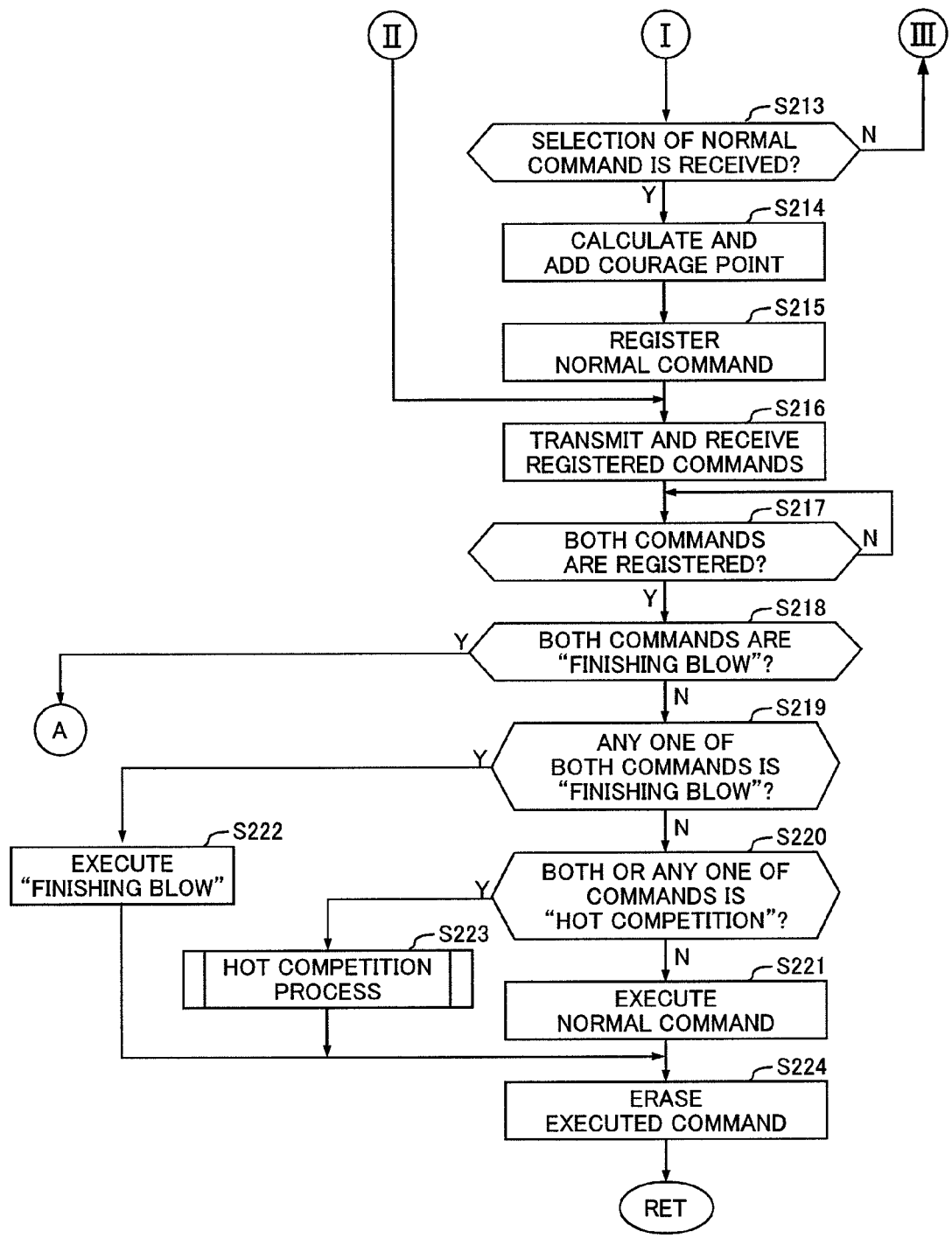

Next, the battle process (Step S108 in FIG. 3) executed by the coin-operated arcade game apparatus 10 will be described. FIGS. 5A and 5B are a flowchart showing an example of a battle process executed by the coin-operated arcade game apparatus 10. In the battle process, progresses to control a battle between the player character PC and the enemy character NPC on the game are executed. In this regard, in a battle on the game according to the present embodiment, after both commands of the player character PC and the enemy character NPC are registered in the command managing table 23b, the commands are in turn executed in the order of priority in accordance with preset command priority information.

In the present embodiment, priority of each of the commands for supplying an instruction to the corresponding character is set up in the order of "finishing blow", "hot competition" and "normal command". For example, in the case where "finishing blow" is registered in the command managing table 23b, the "finishing blow" is executed in priority to any other command. In this regard, the case where the same commands are registered for both of the characters will be described later in detail.

FIG. 6 is an explanatory drawing showing an example of a storage state of the command information registered in the command managing table 23b. As shown in FIG. 6, the registered command information is information in which a command specified by the player character PC is associated with a command specified by the enemy character NPC in the same turn.

When the battle process is started, the CPU 21 first confirms whether a command has been registered in the command managing table 23b (Step S201). In the case where it is confirmed that the command is not registered in the command managing table 23b ("NO" at Step S201), the CPU 21 starts to measure command selecting time using the internal timer (Step S202). The CPU 21 then refers to the player character information managing table 23a, and displays executable normal commands on the display section 25 (Step S203). On the other hand, in the case where the command is registered in the command managing table 23b ("Yes" at Step S201), the CPU 21 executes a process to execute the registered command (Step S225), and erases the executed command from the command managing table 23b (Step S226). The processing flow then shifts to Step S109 of FIG. 3.

When the executable normal commands are displayed on the display section 25, the CPU 21 refers to the player character managing table 23a, and determines whether or not a courage point becomes a specific value or more (Step S204). In the case where it is determined that the courage point is the specific value or more, the CPU 21 determines whether the sword-shaped controller 18 has already been raised upward or not (Step S205). In the case where it is determined that the sword-shaped controller 18 was already raised upward ("Yes" at Step S205), the processing flow directly shifts to Step S207. On the other hand, in the case where it is determined that the sword-shaped controller 18 has never been raised upward, the CPU 21 controls the sword-shaped controller driving section 18D via the input/output control section 28 to raise the sword-shaped controller 18 upward (Step S206). The processing flow then shifts to Step S207.

At Step S207, the CPU 21 determines whether or not the sword-shaped controller 18 that has been raised upward is inserted downward into the housing 11 by the player on the basis of whether a detected signal of the sword-shaped controller driving section 18D is inputted into the CPU 21 or not. In the case where it is determined that the sword-shaped controller 18 is inserted downward ("Yes" at Step S207), the CPU 21 registers "finishing blow" in the command managing table 23b as the registered command for the player character (Step S208). The processing flow then shifts to Step S216. On the other hand, in the case where it is determined that the sword-shaped controller 18 is not inserted downward ("NO" at Step S207), the processing flow shifts to Step S210.

Here, as mentioned above, the "finishing blow" is an attack style that can be carried out only when the courage point is accumulated to the specific value (for example, maximal value) or more. The "finishing blow" is different from a normal command. An effect that a large damage can be applied to an opponent is set up for the "finishing blow". For example, in the present embodiment, an effect that "an HP of a specific enemy character can be caused to lead zero only by means of an attack of 'finishing blow'" is set up.

Next, a process of the case where the CPU 21 determines at Step S204 that the courage point is lower than the specific value ("NO" at Step S204) will be described. In this case, the processing flow shifts to Step S209, and the CPU 21 determines whether or not the courage point becomes a predetermined value (<specific value: for example, a value corresponding to a half of the maximal value) or more. In the case where it is determined that the courage point is the predetermined value or more ("Yes" at Step S209), the CPU 21 determines whether specific conditions are met or not (Step S210). More specifically, the specific conditions are three conditions including: a condition that attribute of the player character PC is "kids"; a condition that attribute of the enemy character NPC is any one of "Satan", "Great Satan" and "kids"; and a condition that the courage point of the enemy character NPC is accumulated to one or more. In the case where it is determined that all the above three conditions are met ("Yes" at Step S210), the CPU 21 receives a rotational operation of the hilt portion 18H as selection of "hot competition" (Step S211).

In the case where the rotational operation is detected by the sword-shaped controller state sensor ("Yes" at Step S211), the CPU 21 registers "hot competition" in the command managing table 23b as the registered commands of the player character PC (Step S212), and the processing flow shifts to Step S216. The content of the "hot competition" will be described later in detail.

In the case where it is determined that the courage point is lower than the predetermined value ("NO" at Step S209), the three conditions described above are not met ("NO" at Step S210), or the rotational operation of the hilt portion 18H is not received ("NO" at Step S211), the CPU 21 receives selection of a normal command (Step S213). Here, the CPU 21 stops measuring the period of time to select a command; calculates a courage point to be applied to the player character PC in accordance with a measurement result; and adds the calculated courage point to the acquired courage point in the player character managing table 23a (Step S214).

The "normal command" is a command that can be selected without reference to the courage point. In the present embodiment, the CPU 21 registers the corresponding normal command in the command managing table 23b as a registered command for the player character PC in the case where the first player operation button 16a is operated by the player 1 (Step S215).

As described above, when the command is registered in the command managing table 23b, the CPU 21 notifies the coin-operated arcade game apparatus 10' operated by the player 2 of registered command information (Step S216), and also receives notification from the coin-operated arcade game apparatus 10'.

Next, the CPU 21 confirms whether both of the commands of the player character PC and the enemy character NPC are registered in the command managing table 23b or not (Step S217). In the case where it is confirmed that the command of the enemy character NPC is not registered ("NO" at Step S217), the CPU 21 waits until the CPU 21 is notified from the coin-operated arcade game apparatus 10'. In the case where it is confirmed that both of the commands are registered ("Yes" at Step S217), the CPU 21 compares the commands thus registered with each other (hereinafter, referred to as the "registered command").

In the case where it is determined that both of the registered commands are "finishing blow" ("Yes" at Step S218), the CPU 21 causes the processing flow to shift to Step S308 of FIG. 10B (will be described later). In this regard, the CPU 21 may be configured so as to cause the display section 25 to display, at this time, a screen in which both the player character PC, and so that the enemy character NPC start "finishing blow" at the same time and the processing flow shifts to Step S308 before a damage is applied to the corresponding character.

In the case where it is determined that both of the registered commands are not "finishing blow" ("NO" at Step S218), the CPU 21 confirms whether any one of the registered commands is "finishing blow" or not (Step S219). In the case where it is confirmed that any one of the registered commands is "finishing blow" ("Yes" at Step S219), the CPU 21 executes a process for carrying out the registered "finishing blow" (Step S222).

In the case where it is confirmed that both of the registered commands are not "finishing blow" ("NO" at Step S219), the CPU 21 confirms whether at least one of the registered commands is "hot competition" or not (Step S220). In the case where it is confirmed that both of or any one of the registered commands is "hot competition" ("Yes" at Step S220), the CPU 21 executes a hot competition process (will be described later).

In the case where it is confirmed that both of the registered commands are not "hot competition" ("NO" at Step S220), the CPU 21 executes the registered normal command (Step S221). In this case, the CPU 21 first executes the command registered in the command managing table 23b. In this regard, the CPU 21 may be configured so that priority for execution is set up in accordance with the type of normal command, or the priority is determined in accordance with a status of the character.

When the registered command is executed, the CPU 21 erases the registered command thus executed from the command managing table 23b (Step S224), and terminates the battle process. The processing flow then shifts to Step S109 of the game process.

Figure 7:
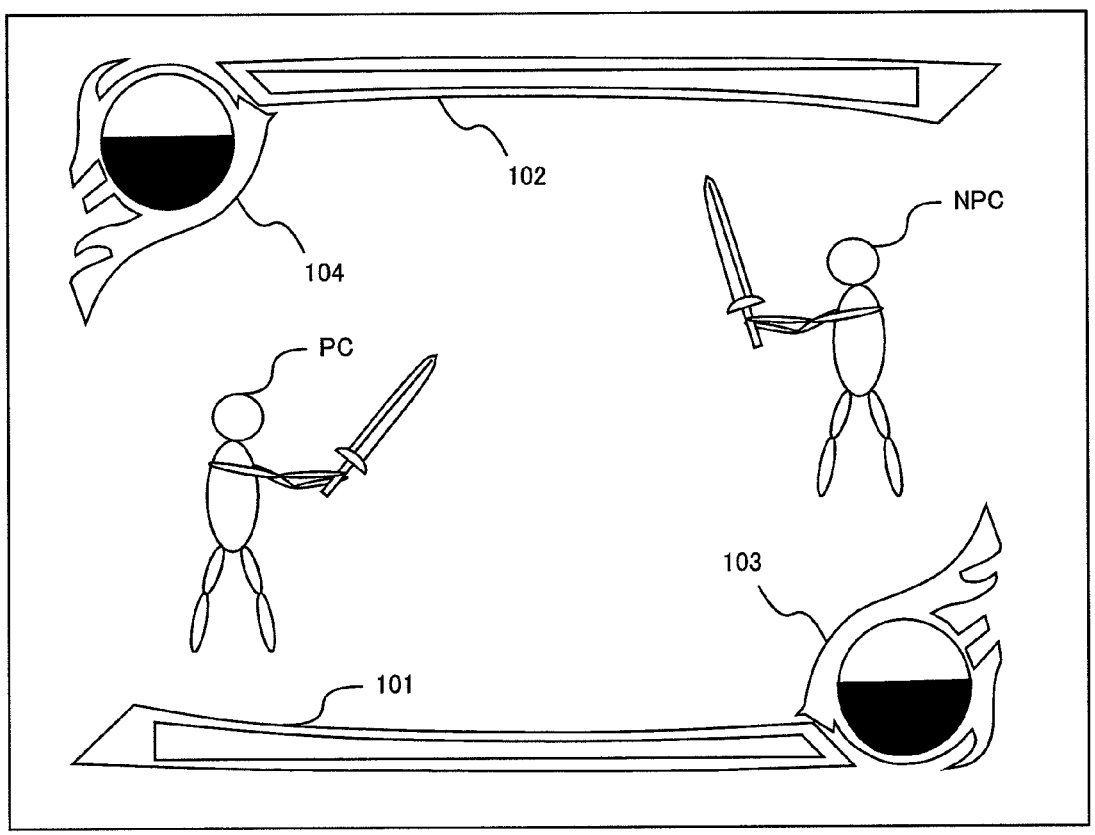
FIG. 7 is an explanatory drawing showing an example of a game screen.

Next, an outline of the "hot competition" in the battle executed by the coin-operated arcade game apparatus 10 will be described. FIG. 7 is an explanatory drawing showing an example of the game screen for explaining an outline of the hot competition. In the present embodiment, as shown in FIG. 7, the player character PC and the enemy character NPC are distinguishably displayed on the game screen. HP gauges 101, 102 indicating HPs of the respective characters and courage point gauges (orb gauges) 103, 104 indicating acquired amounts of courage points of the respective characters are provided.

Figure 8:
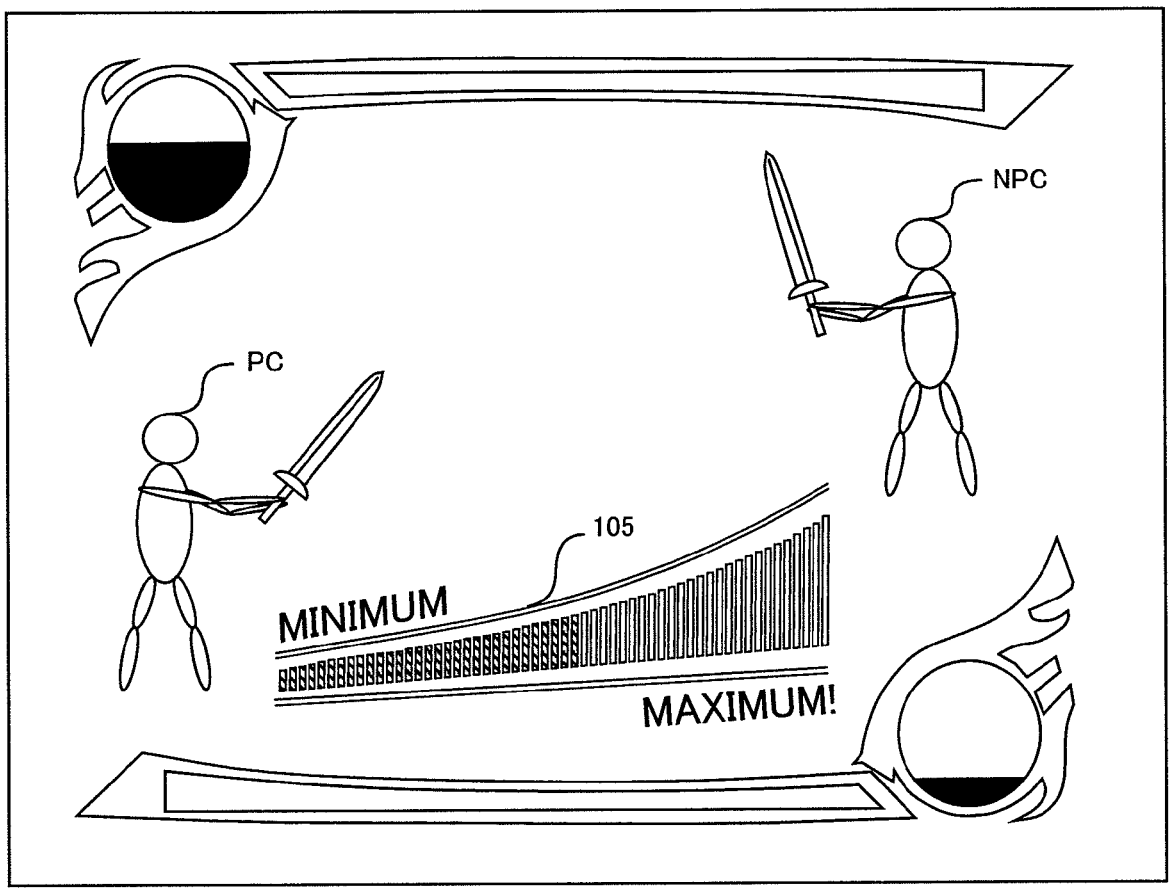
FIG. 8 is an explanatory drawing showing another example of the game screen.

In the present embodiment, when hot competition is started, display of a display screen for informing the player that hot competition is started is carried out. After the sword-shaped controller 18 is raised to a predetermined position, for example, as shown in FIG. 8, a repeatedly striking magnification gauge 105 is displayed at the center of the game screen. A meter in the repeatedly striking magnification gauge 105 is set so as to vibrate with predetermined amplitude. The player maintains a state where the hilt portion 18H is rotated with a predetermined angle, whereby the player can use the acquired courage point as a level of the repeatedly striking magnification gauge 105. This makes it possible to increase the level of the repeatedly striking magnification gauge 105. Namely, while the hilt portion 18H is in the state where the hilt portion 18H is rotated by the predetermined angle, the acquired courage point is being gradually used as the level of the repeatedly striking magnification gauge 105. Therefore, the player may consider how much acquired courage point is used as the level of the repeatedly striking magnification gauge 105 while watching the state of the courage point gauge 103 and the state of the repeatedly striking magnification gauge 105, and carry out an operation to rotate the hilt portion 18H by the predetermined angle. In this regard, in the present embodiment, the level according to the amount of used courage point is set in the repeatedly striking magnification gauge 105. A position at which the meter vibrates in the repeatedly striking magnification gauge 105 for every level may be set so as to approach the maximal value of the repeatedly striking magnification gauge 105. Moreover, in order to cause the player to recognize a change in the level easily, the game may be configured so that a color of the repeatedly striking magnification gauge 105 is changed in accordance with the level.

Next, in response to an operation by the player to insert the sword-shaped controller 18 downward, vibration of the meter in the repeatedly striking magnification gauge 105 is stopped, and a "repeatedly striking magnification bonus" is determined in accordance with the stopped position. Then, "repeatedly striking magnification" according to the "repeatedly striking magnification bonus" and a preset "repeatedly striking magnification corrected value" are determined. In this regard, in the present embodiment, in the case where the sword-shaped controller 18 is not inserted into the housing 11 within a predetermined period of time (for example, 10 seconds), the repeatedly striking magnification is set to the minimum value (for example, 0%).

In the case where the "repeatedly striking magnification" of the enemy character (fighting character) NPC is also determined, hot competition is started. The game is configured so that in the hot competition, one character whose value of "hot competition power" is larger becomes a winner and this affects the courage point so as to develop a subsequent battle to advantage in the present embodiment, for example. The value of "hot competition power" is the product of the number of times to push the operation button 16 within a predetermined period of time (for example, for four seconds) and the repeatedly striking magnification. In this regard, in the case where values of the hot competition power of both characters are the same as each other, the character that sets up the hot competition is determined to be a winner. Moreover, in the case where both of the characters set up the hot competition, victory or defeat is determined by comparing statuses of both of the characters with each other.

Figure 9:
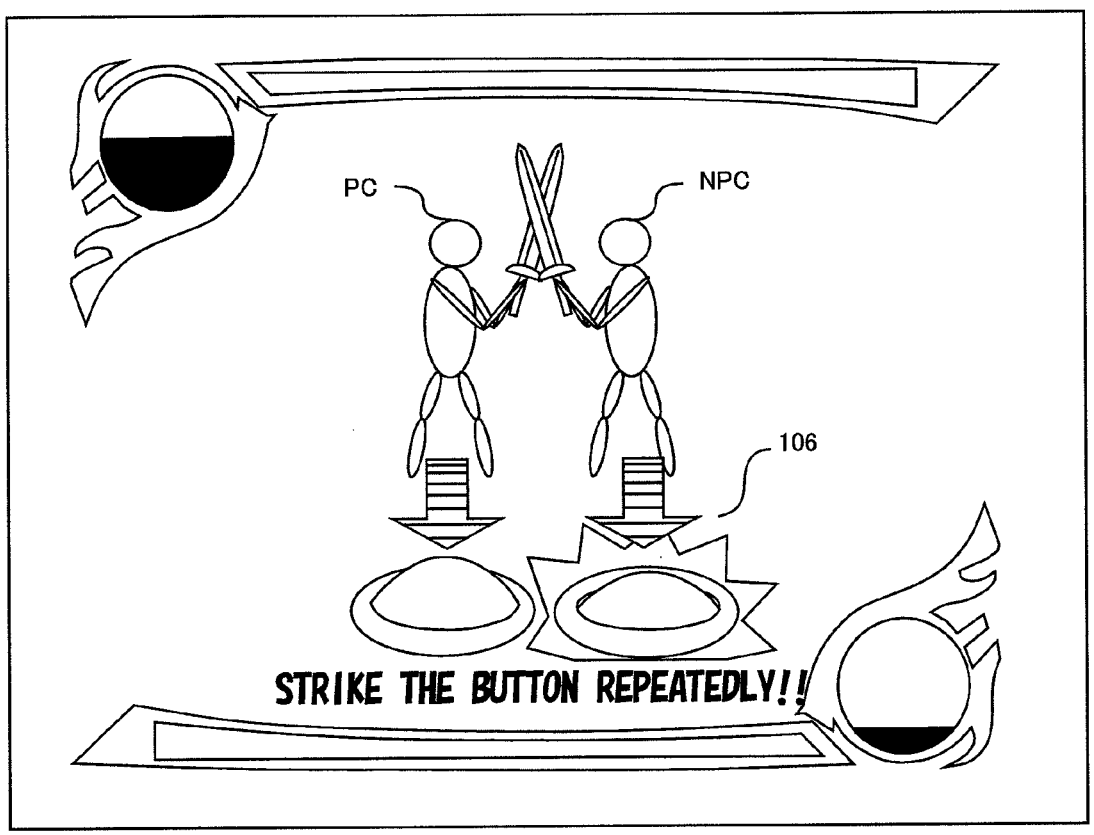
FIG. 9 is an explanatory drawing showing still anther example of the game screen.

Further, in order to inform the player that the time when the predetermined time to receive the number of times to push the operation button 16 elapses is a period of time to receive the number of times to push the operation button 16, as shown in FIG. 9, an operation button image 106 is displayed in the present embodiment, for example.

When victory or defeat of the hot competition is determined, a process according to a result of the fighting is carried out. In the hot competition on the game according to the present embodiment, as a method of starting the hot competition, there are two cases including the case where "hot competition" is selected at a selection screen and the case where both the player character PC and the enemy character NPC select "finishing blow". In the case of the former, the game is configured so that the used courage point is returned to a winner and a loser loses the courage point acquired until that time. Further, in the case of the latter, the game is configured so that "finishing blow" by the winner is carried out.

Figure 10A:
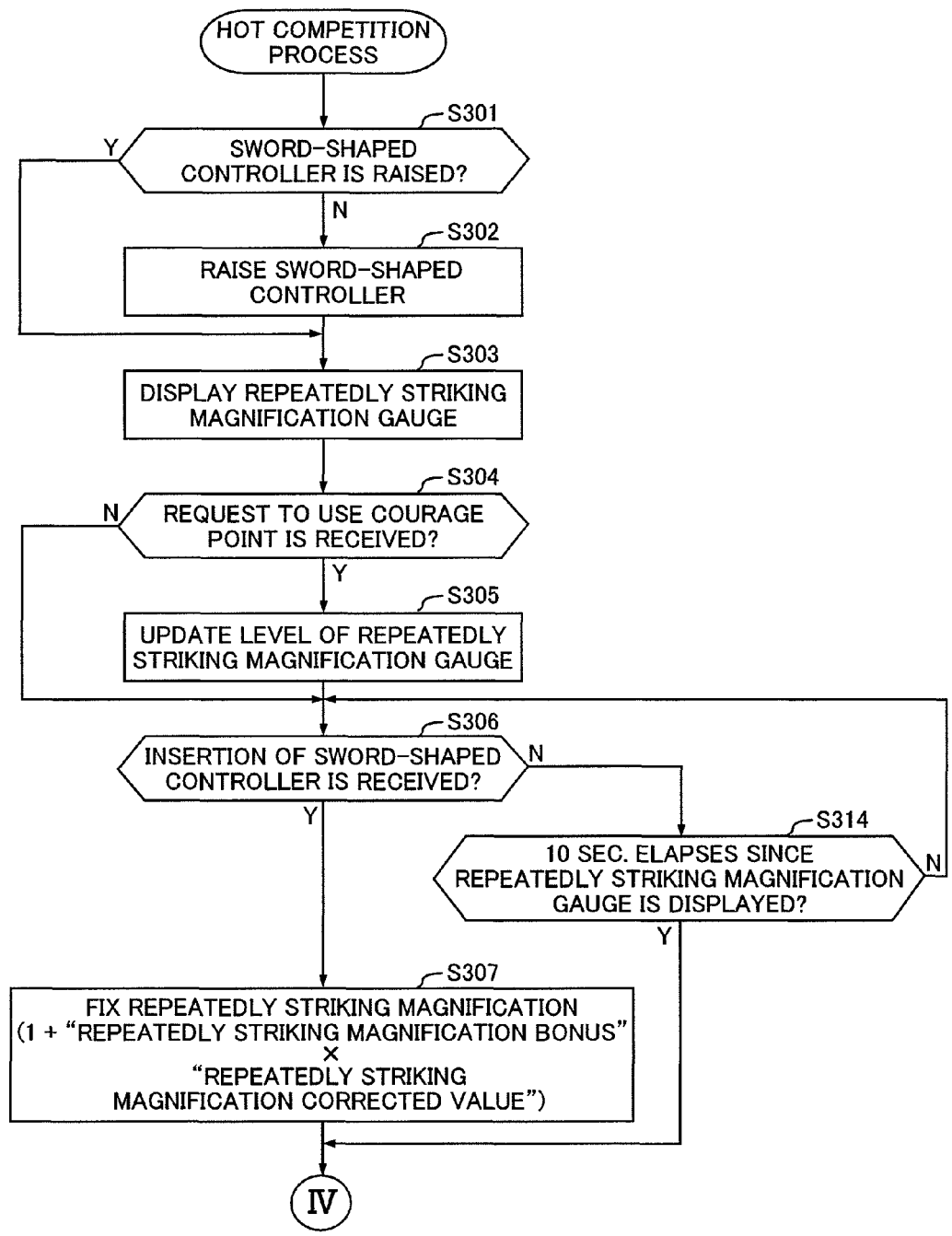

Next, the hot competition process (Step S223 of FIG. 5B) for carrying out "hot competition" executed by the coin-operated arcade game apparatus 10 will be described. FIGS. 10A and 10B are a flowchart showing an example of the hot competition process executed by the coin-operated arcade game apparatus 10. Here, processes including reception of an execution command for the "hot competition", comparison between hot competition power of the player character PC and hot competition power of the enemy character NPC, and reflection of its result to the battle are executed.

In the hot competition process, the CPU 21 determines whether the sword-shaped controller 18 has already been raised upward or not (Step S301). In the case where it is determined that the sword-shaped controller 18 has already been raised upward ("Yes" at Step S301), the processing flow directly shifts to Step S303. In the case where it is determined that the sword-shaped controller 18 is not raised upward ("No" at Step S301), the CPU 21 controls the sword-shaped controller driving section 18D via the input/output control section 28 to raise the sword-shaped controller 18 upward (Step S302). The processing flow then shifts to Step S303.

At Step S303, the CPU 21 displays the repeatedly striking magnification gauge 105 on the display section 25. The CPU 21 then receives a request to use the courage point from the player 1 (Step S304). In this regard, in the present embodiment, the CPU 21 receives a rotational operation of the hilt portion 18H as the request to use the courage point. For example, in the case where the CPU 21 do not receive the request to use the courage point by the player 1 within a preset time limit ("NO" at Step S304), the CPU 21 causes the processing flow to shift to Step S306.

In the case where the CPU 21 receives the request to use the courage point by the player 1 ("Yes" at Step S304), the CPU 21 executes a process to convert the acquired courage point stored in the player character managing table 23a into a usage courage point in the repeatedly striking magnification managing table 23c gradually (for example, 10 points per one second) while the rotational operation of the hilt portion 18H is carried out. Then, when the rotational operation of the hilt portion 18H by the player 1 is terminated or a value of the acquired courage point stored in the player character managing table 23a becomes zero, the CPU 21 terminates reception of the request to use the courage point.

Next, the CPU 21 refers to the repeatedly striking magnification gauge managing table 23c, and updates information on the repeatedly striking magnification gauge 105 in accordance with the used courage point (Step S305). FIG. 11 is an explanatory drawing showing an example of a storage state of repeatedly striking magnification gauge information in the repeatedly striking magnification gauge managing table 23c. As shown in FIG. 11, the repeatedly striking magnification gauge information includes: an activatable level of the repeatedly striking magnification gauge 105; a color of the gauge 105; a necessary courage point; amplitude of the meter; and a repeatedly striking magnification corrected value that is set up in advance. In this regard, the repeatedly striking magnification gauge information may be configured so as to include parameters, such as "speed of vibration of the meter" and "reaction time of the meter after a request to stop is received", which can adjust difficulty to cause the meter in the repeatedly striking magnification gauge 105 to be stopped at a target position, in addition to the above parameters.

Next, the CPU 21 receives an insertion operation for the sword-shaped controller 18 as a request to stop the vibration of the meter in the repeatedly striking magnification gauge 105 (Step S306). When the insertion operation for the sword-shaped controller 18 is received ("Yes" at Step S306), the CPU 21 stops the vibration of the meter in the repeatedly striking magnification gauge 105, and stores a repeatedly striking magnification bonus according to a stopped position in the RAM 23 (Step S307). On the other hand, in the case where the insertion operation for the sword-shaped controller 18 is not received within a preset time limit (for example, for 10 seconds) ("NO" at Step S306), in the present embodiment, the CPU 21 determines the repeatedly striking magnification by means of a calculation formula as follows (Step S308). The calculation formula uses the repeatedly striking magnification bonus and the preset repeatedly striking magnification corrected value.

(Repeatedly striking magnification)=1+(Repeatedly striking magnification bonus)×(Repeatedly striking magnification corrected value)

In this regard, in the case where the processing flow shifts to Step S308 from Step S218 or Step S314, the CPU 21 determines the repeatedly striking magnification with the repeatedly striking magnification bonus being set to zero. Namely, in the case of the present embodiment, the repeatedly striking magnification becomes one.

When the repeatedly striking magnification is determined, the CPU 21 displays a hot competition screen on the display section 25, and receives the number of times to push the operation button 16 by the player 1 for a predetermined period of time (for example, for four seconds) (Step S310). In this regard, at this time, the CPU 21 may be configured so that the display section 25 is caused to display a hot competition gauge in the motif of a blade of a sword on the game screen in order to inform the player of which the player character PC or the enemy character NPC is advantageous before a winner of the hot competition is determined, for example, and to display a state where courage effects displayed in the hot competition gauge are pressed by each other in accordance with the number of times to push the operation buttons 16.

Next, the CPU 21 calculates hot competition power (Step S310). In the present embodiment, the CPU 21 uses the product of the number of times to push the operation button 16 and the repeatedly striking magnification as the hot competition power. When the hot competition power of the player character PC is determined, the CPU 21 compares the hot competition power of the player character PC with that of the enemy character PC in the case where the hot competition power of the enemy character NPC is determined. The CPU 21 then registers the character whose numeral number of the hot competition power is larger in the RAM 23 as a winner of the hot competition (Step S311). In this regard, in the case where the enemy character NPC is a character controlled in accordance with a game processing program, for example, a win percentage that the player character PC wins the hot competition may be determined by means of a calculation formula as follows, for example. The calculation formula uses the number of times to push the operation button 16, the repeatedly striking magnification, and strength of the enemy character NPC that is set to the enemy character NPC in advance.

(Win percentage)=(Strength of enemy character)−10000/{(Number of times to push button)×(Repeatedly striking magnification)}

When the winner of the hot competition is registered, the CPU 21 refers to the command managing table 23b, and confirms whether both of the registered commands are "finishing blow" or not (Step S312). In the case where it is confirmed that both commands are "finishing blow" ("Yes" at Step S312), the CPU 21 executes a process to carry out "finishing blow" by the winner (Step S315). The hot competition process is then terminated, and the processing flow shifts to Step S224 of the battle process. In the case where the commands registered in the command managing table 23b have the other combination, the CPU 21 applies the courage point used at Step S304 to the winner (Step S313), and terminates the hot competition process. The processing flow then shifts to Step S224 of the battle process.

In this regard, in order to cause the battle to proceed smoothly, the game may be configured so that hot competition is executed during one battle only once. In this case, when it is determined, at Step S220 of the battle process, that the processing flow shifts to the hot competition process, the CPU 21 may store that effect in the RAM 23. Then, the game may be configured so that it is set as a condition for determination at Step S210 of the battle process that there is no record to shift to the hot competition process. By adopting such a configuration, even though the player registers "hot competition", hot competition is carried out once in one battle. Further, in the case where both the player character PC and the enemy character NPC register "finishing blow", the execution number of times of hot competition is not limited.

Although the above example has been explained using the coin-operated arcade game apparatus 10 as an example, the content of the game can be applied to other video game processing apparatuses such as a home game apparatus and a portable game apparatus. Further, although the processes of the fighting between the player 1 and the player 2 have been explained as an example in the above example, the case where the CPU 21 controls the enemy character NPC using the similar processes can be carried out.

As explained above, in the embodiment described above, the video game processing apparatus (for example, coin-operated arcade game apparatus 10) that controls progress of the video game in which the player character operated by the player fights against the enemy character and one character wins by lowering the life parameter (for example, HP) set up for the other character by means of an attack to a battle impossible value (for example, "0 (zero)") at which the other character cannot fight (that is, the other character becomes a battle impossible state) is configured so as to: apply a first courage point (the courage point of the player character) to the player character in accordance with battle content of the player character; applies a second courage point (the courage point of the enemy character) to the enemy character in accordance with battle content of the enemy character; when the predetermined operation is received, determine whether or not each of an accumulated value of the first courage point and an accumulated value of the second courage point is a predetermined value or more (for example, a value corresponding to a half of the maximal value for the first courage point or more, and one or more for the second courage point); and control special fighting (for example, "fighting by hot competition"), which is different from a battle for lowering the life parameter, between the player character and the enemy character in the case where it is determined that both the accumulated values of the first courage point and the second courage point are the predetermined value or more. Thus, it is possible to carryout battle control in which strategic characteristics rich in variation are improved, which makes the best of a skill of the player.

Namely, the video game processing apparatus according to the present invention is configured so that the courage point can be applied to not only the player character but also the enemy character, and the special fighting (for example, "fighting by hot competition") is controlled on the basis of the accumulated values of the courage points. Thus, it is possible to carry out battle control in which strategic characteristics rich in variation are improved, which makes the best of a skill of a player. For example, the battle control includes a strategic characteristic in which a player brings a battle to special fighting while confirming a status of the courage points of both of the characters.

Further, in the embodiment described above, each of the first and second courage points is a point that is to be applied to the corresponding character in accordance with a period of time that elapses from the time when reception of selection of any action content specifying command (various commands such as the normal commands) for specifying action content of the corresponding character in a battle is started to the time when selection of an action content specifying command is actually received. Thus, it is possible to urge the player to carry out command selection quickly, and this makes it possible to carry out battle control, which makes the best of a skill of the player.

Further, in the embodiment described above, the video game processing apparatus (for example, coin-operated arcade game apparatus 10) is configured so as to: receive an input of a predetermined command (for example, pressing of the button) until a predetermined period of time elapses after the special fighting is started; count up the reception number of times when the input of the predetermined command is received during the predetermined period of time; calculate a special fighting point (for example, "hot competition power") on the basis of the reception number of times; and determine that one character whose special fighting point is more than that of the other character wins the special fighting. Thus, it is possible to carry out battle control for the special fighting with a simple configuration.

Further, in the embodiment described above, the video game processing apparatus (for example, the coin-operated arcade game apparatus 10) is configured so as to: receive a magnification level determining point (a part or all of the courage point), used to determine a magnification level of the courage point; and determine the magnification level (the repeatedly striking magnification) on the basis of the magnification level determining point; and calculate the special fighting point (for example, "hot competition power") t by multiplying the reception number of times by the magnification level. Thus, by using how much courage point of the player character and setting up a magnification level, it is possible to carry out battle control rich in variation, which makes the best of a skill of a player. It is also possible to carry out battle control in which such a strategic characteristic is improved.

Further, in the embodiment described above, the video game processing apparatus (for example, the coin-operated arcade game apparatus 10) is configured so as to apply the courage point used as the magnification level determining point to the character that won the special fighting. Thus, it is possible to carry out battle control rich in variation, which makes the best of a skill of a player. For example, the player can determine how much courage point of the player character is used to set up the magnification level in consideration of application of the courage point by victory. It is also possible to carry out battle control in which such a strategic characteristic is improved.

Further, in the embodiment described above, the video game processing apparatus (for example, the coin-operated arcade game apparatus 10) is housed or placed in the housing 11, for example, and is configured so as to: cause a predetermined member (sword-shaped controller 18) capable of being inserted into the housing 11 by means of an operation of the player to project from the housing 11; receive the magnification level determining point (a part or all of the courage point) in accordance with a period of time while the predetermined member caused to project from the housing 11 becomes a predetermined rotational state by means of a rotational operation of a rotary section (hilt portion 18H) provided in the predetermined member; and determine, when the predetermined member caused to project from the housing 11 is inserted into the housing 11, the received magnification level determining point as the magnification level determining point used to determine the magnification level. Thus, by operating the rotary section, it is possible to determine the magnification level determining point used to determine the magnification level, and this makes it possible to carry out battle control rich in variation.

Further, in the embodiment described above, the video game processing apparatus (for example, the coin-operated arcade game apparatus 10) is housed or placed in the housing 11, and is configured so as to: cause a predetermined member (sword-shaped controller 18) capable of being inserted into the housing 11 by means of an operation of the player to project from the housing 11; and receive a rotational operation of a rotary section (hilt portion 18H) provided in the predetermined member caused to project from the housing 11 as the predetermined operation. Thus, it is possible to shift to special fighting (for example, "fighting by hot competition") by operating the rotary section, and this makes it possible to carry out battle control rich in variation.

In this regard, in the embodiment described above, a video game processing apparatus (for example, the coin-operated arcade game apparatus 10) carries out the various processes described above in accordance with a control program (computer program for processing the video game) stored in a storage device (ROM 22) equipped by the video game processing apparatus.

According to the present invention, it is useful to provide a video game capable of carrying out battle control in which strategic characteristics rich in variation are improved, which makes the best of a skill of a player.

What is claimed is:

1. A video game processing apparatus for controlling progress of a video game in which a player character operated by a player fights against an enemy character and one of the player character and the enemy character wins by lowering a life parameter of an other of the player character and the enemy character by an attack to a battle impossible value at which the other of the player character and the enemy character cannot fight, the video game processing apparatus comprising:
a processor;
a first courage point applier that applies a first courage point to the player character in accordance with battle content of the player character;
a second courage point applier that applies a second courage point to the enemy character in accordance with battle content of the enemy character;
a predetermined operation receiver that receives a predetermined operation from the player;
a courage point determiner that, when the predetermined operation receiver receives the predetermined operation, determines whether each of an accumulated value of the first courage point and an accumulated value of the second courage point is at least a predetermined value; and a special fighting controller that controls special fighting between the player character and the enemy character when the courage point determiner determines that both the accumulated value of the first courage point and the accumulated value of the second courage point are at least the predetermined value, the special fighting being different than a battle for lowering the life parameter,
wherein the enemy character is one of operated by an other player and controlled by a computer, and
each of the first courage point and the second courage point is applied to a corresponding one of the player character and the enemy character in accordance with a period of time that elapses from a reception of a selection of any action content specifying command for specifying action content of the corresponding one of the player character and the enemy character when the battle is started to when a selection of an action content specifying command is actually received.

2. The video game processing apparatus according to claim 1, wherein the special fighting controller includes:
a predetermined command receiver that receives an input of a predetermined command until a predetermined period of time elapses after the special fighting is started;
a reception number counter that counts a reception number of times that the input of the predetermined command is received during the predetermined period of time;
a special fighting point calculator that calculates a special fighting point based on the reception number of times counted by the reception number counter; and
a winner determiner for determining that one of the player character and the enemy character that has the special fighting point calculated by the special fighting point calculator that is more than a special fighting point of an other of the player character and the enemy character wins the special fighting.

3. The video game processing apparatus according to claim 2, wherein the special fighting controller further includes:
a usage point receiver that receives a magnification level determining point, the magnification level determining point being used to determine a magnification level of at least one of the first courage point and the second courage point; and
a magnification level determiner that determines the magnification level based on the magnification level determining point received by the usage point receiver,
wherein the special fighting point calculator calculates the special fighting point by multiplying the reception number of times counted by the reception number counter by the magnification level determined by the magnification level determiner.

4. The video game processing apparatus according to claim 3, wherein the special fighting controller further includes a courage point applier that applies the at least one of the first courage point and the second courage point determined from the magnification level determining point to the one of the player character and the enemy character that wins the special fighting.

5. The video game processing apparatus according to claim 3, wherein the video game processing apparatus includes a housing, and the video game processing apparatus further comprises:
a member projection controller that causes a predetermined member to project from the housing, the member projection controller provided in the housing, the predetermined member configured to be inserted into the housing by an operation of the player, wherein the usage point receiver receives the magnification level determining point in accordance with a period of time during which the predetermined member is projected from the housing by the member projection controller and is in a predetermined rotational state by a rotational operation of a rotary section, the predetermined member provided with the rotary section, and wherein the magnification level determiner determines the magnification level determining point based on when the predetermined member is inserted into the housing while the predetermined member is projected from the housing by the member projection controller.

6. The video game processing apparatus according to claim 1, wherein the video game processing apparatus includes a housing, and the video game processing apparatus further comprises:

a member projection controller that causes a predetermined member to project from the housing, the member projection controller provided in the housing, the predetermined member configured to be inserted into the housing by an operation of the player, wherein the predetermined operation receiver receives a rotational operation of a rotary section as the predetermined operation and the predetermined member is projected from the housing by the member projection controller with the rotary section.

7. A non-transitory computer-readable medium including a computer program product for processing a video game by controlling progress of the video game in which a player character operated by a player fights against an enemy character, and one of the player character and the enemy character wins by lowering a life parameter of an other of the player character and the enemy character by an attack to a battle impossible value at which the other of the player character and the enemy character cannot fight, the computer program product causing a computer to execute:

applying a first courage point to the player character in accordance with battle content of the player character;

applying a second courage point to the enemy character in accordance with battle content of the enemy character;

receiving a predetermined operation from the player;

determining, when the predetermined operation is received, whether each of an accumulated value of the first courage point and an accumulated value of the second courage point is at least a predetermined value; and controlling special fighting between the player character and the enemy character when it is determined that both the accumulated value of the first courage point and the accumulated value of the second courage point are at least the predetermined value, the special fighting being different than a battle for lowering the life parameter, wherein the enemy character is one of operated by an other player and controlled by a computer, and each of the first courage point and the second courage point is applied to a corresponding one of the player character and the enemy character in accordance with a period of time that elapses from a reception of a selection of any action content specifying command for specifying action content of the corresponding one of the player character and the enemy charter when the battle is started to when a selection of an action content specifying command is actually received.

* * * * *